(12) United States Patent
Geiger

(10) Patent No.: US 11,333,871 B2
(45) Date of Patent: May 17, 2022

(54) METHOD AND MICROSCOPE FOR IMAGING A SAMPLE

(71) Applicant: Leica Microsystems CMS GmbH, Wetzlar (DE)

(72) Inventor: Romina Geiger, Walldorf (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 77 days.

(21) Appl. No.: 16/896,267

(22) Filed: Jun. 9, 2020

(65) Prior Publication Data

US 2020/0393658 A1    Dec. 17, 2020

(30) Foreign Application Priority Data

Jun. 14, 2019   (EP) ..................... 19180381

(51) Int. Cl.
| | | |
|---|---|---|
| *G06T 3/40* | (2006.01) | |
| *G02B 21/00* | (2006.01) | |
| *G06T 7/10* | (2017.01) | |
| *G06T 5/00* | (2006.01) | |
| *H04N 5/247* | (2006.01) | |

(52) U.S. Cl.
CPC ....... *G02B 21/008* (2013.01); *G02B 21/0032* (2013.01); *G02B 21/0076* (2013.01); *G06T 3/40* (2013.01); *G06T 5/003* (2013.01); *G06T 5/007* (2013.01); *G06T 7/10* (2017.01); *H04N 5/247* (2013.01); *G06T 2207/10056* (2013.01); *G06T 2207/20081* (2013.01)

(58) Field of Classification Search
CPC .............. G02B 21/008; G02B 21/0032; G02B 21/0076; G02B 21/002; G02B 21/365; G06T 7/10; G06T 3/40; G06T 5/003; G06T 5/007; G06T 2207/10056; G06T 2207/20081; H04N 5/247
See application file for complete search history.

(56) References Cited

U.S. PATENT DOCUMENTS 5,633,715 A  *  5/1997  Ai .................... G01B 9/02083
                                                  356/497
9,564,291 B1 *  2/2017  Own .................... H01J 37/222
(Continued)

FOREIGN PATENT DOCUMENTS

| DE | 100 43 986 A1 | 3/2002 |
|---|---|---|
| DE | 100 43 992 A1 | 3/2002 |

(Continued)

OTHER PUBLICATIONS

Conrad, Christian et al., "Micropilot: automation of fluorescence microscopy-based imaging for systems biology", Nature America, Inc., Nature Methods, Sep. 1, 2011.

*Primary Examiner* — Howard D Brown, Jr.
(74) *Attorney, Agent, or Firm* — Leydig, Voit & Mayer, Ltd.

(57) ABSTRACT

A method for imaging a sample using a microscope includes recording a first image of the sample, the first image being represented by image data. Sample information is extracted from the first image by analyzing the image data using an analyzer. At least a part of the sample is scanned with a light beam while modulating the light beam based on the extracted sample information. A second image of the sample is recorded during and/or after scanning the sample with the modulated light beam.

23 Claims, 2 Drawing Sheets

(56) References Cited

U.S. PATENT DOCUMENTS

| | | | |
|---|---|---|---|
| 2002/0027203 A1* | 3/2002 | Engelhardt | G02B 21/0076 250/459.1 |
| 2002/0027709 A1* | 3/2002 | Engelhardt | G02B 21/0076 359/368 |
| 2002/0041439 A1* | 4/2002 | Engelhardt | G02B 21/002 359/368 |
| 2003/0076571 A1* | 4/2003 | MacAulay | A61B 1/00172 359/237 |
| 2004/0150880 A1* | 8/2004 | Nakata | G02B 21/0076 359/371 |
| 2007/0066967 A1* | 3/2007 | Sieckmann | G02B 21/365 606/13 |
| 2015/0335628 A1* | 11/2015 | Ren | A61K 31/4422 546/321 |
| 2015/0338628 A1 | 11/2015 | Knebel et al. | |
| 2018/0120344 A1* | 5/2018 | Prater | G01N 21/3563 |
| 2019/0219811 A1* | 7/2019 | Keller | G02B 27/0025 |
| 2020/0242735 A1* | 7/2020 | Dai | G02B 21/367 |
| 2021/0003834 A1* | 1/2021 | Jovin | G02B 21/0048 |
| 2021/0319585 A1* | 10/2021 | Odobez | G06T 7/74 |

FOREIGN PATENT DOCUMENTS

| | | |
|---|---|---|
| DE | 100 50 529 A1 | 4/2002 |
| EP | 2322969 A1 | 5/2011 |
| WO | WO 2005/040762 A1 | 5/2005 |
| WO | WO 2014/054016 A1 | 4/2014 |
| WO | WO 2018/093901 A1 | 5/2018 |

\* cited by examiner

METHOD AND MICROSCOPE FOR IMAGING A SAMPLE

CROSS-REFERENCE TO PRIOR APPLICATION

Priority is claimed to European Patent Application No. EP 19180381.6, filed on Jun. 14, 2019, the entire disclosure of which is hereby incorporated by reference herein.

FIELD

The present invention relates to a method for imaging a sample using a microscope. Further, the present invention relates to a microscope for imaging a sample.

BACKGROUND

In conventional microscopy methods, a spatial control of laser usage in confocal imaging software is generally limited to manually drawn regions of interest (ROIs), i.e. to ROIs which have been determined by a user in advance. Accordingly, defining complex ROI structures is time-consuming and might be the limiting factor in specific applications, especially in in vivo experiments.

The generation of binary masks using thresholds as well as image segmentation is a tool that is successfully used during image processing. However, such binary masks have not yet been used in imaging experiments.

Regarding prior art, reference is made to documents DE 100 43 992 A1, DE 100 43 986 A1, and DE 100 50 529 A1 disclosing microscopy methods in which preview images are generated, these preview images being used to mark an ROI. Further, document WO 2005/040762 A1 discloses a method in which an electronic image of at least one picture detail of a preparation is captured, and a picture detail is processed analytically. Subsequently, an object to be cut out is automatically determined, and a cutting line is automatically drawn around said object to be cut out. Further, Conrad et al., "Micropilot: automation of fluorescence microscopy-based imaging for systems biology", Nature Methods, 2011 discloses an imaging software automatically detecting ROIs.

SUMMARY

In an embodiment, the present invention provides a method for imaging a sample using a microscope. A first image of the sample represented by image data is recorded. Sample information is extracted from the first image by analyzing the image data using an analyzer. At least a part of the sample is scanned with a light beam while modulating the light beam based on the extracted sample information. A second image of the sample is recorded during and/or after scanning the sample with the modulated light beam.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
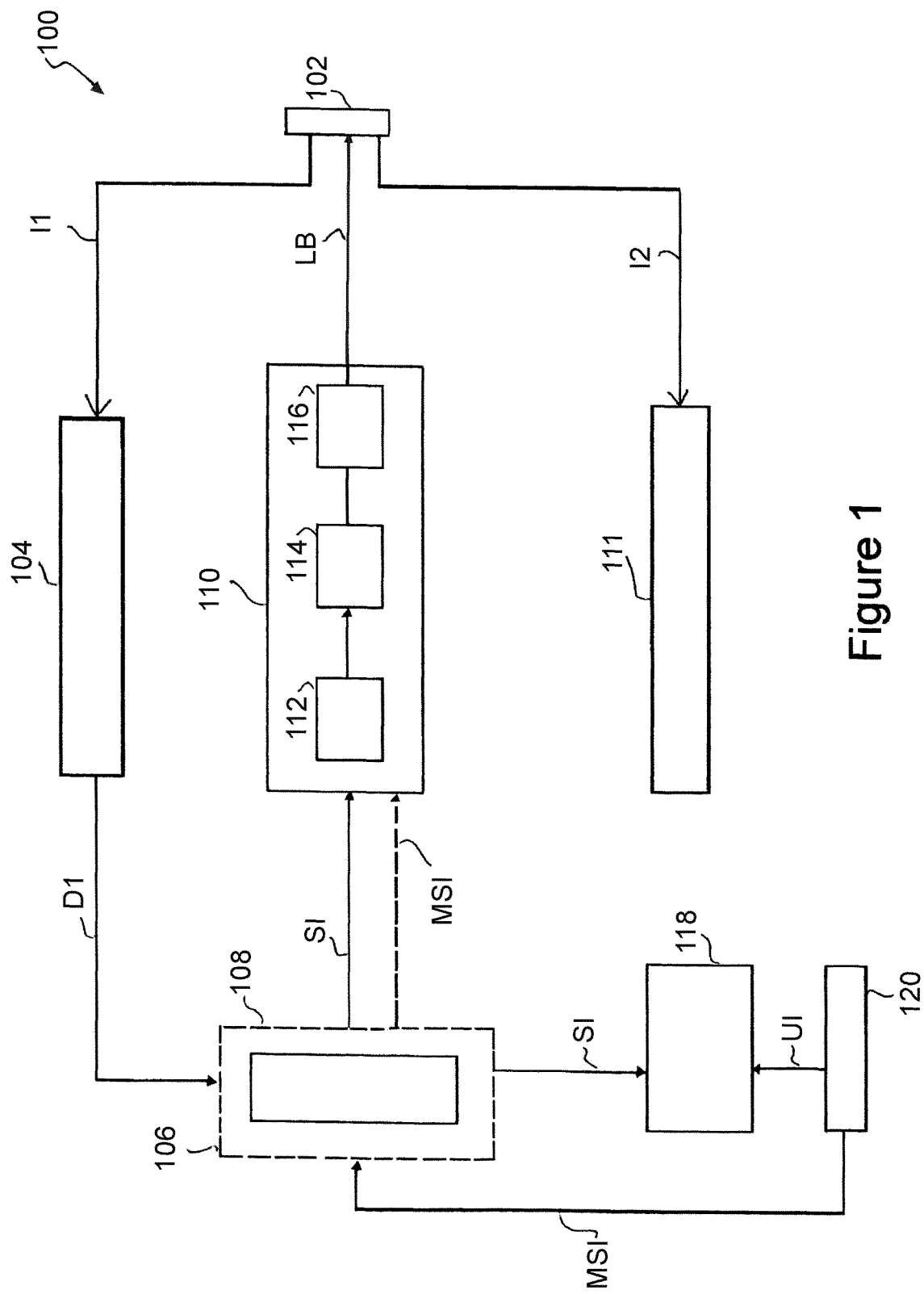
FIG. 1 is a block diagram illustrating a method and a microscope for imaging a sample according to an embodiment.

In an embodiment, the present invention provides a method and a microscope for imaging a sample facilitating spatial control of a light beam applied to the sample.

The method for imaging a sample according to an embodiment of the present invention comprises the steps of: recording a first image of the sample, the first image being represented by image data; extracting sample information from the first image by analyzing the image data using an analyzer configured to analyze the image data; scanning at least a part of the sample with a light beam while modulating the light beam based on the extracted sample information; and recording a second image of the sample during and/or after scanning the sample with the modulated light beam.

According to this method, a sample information is automatically generated based on an analysis of a first image, wherein the sample information enables a controlled modulation of the light beam while the light beam is scanning the sample. In this way, the controlled modulation based on the extracted sample information can be used for providing an effective spatial control of the laser light usage in a specific imaging experiment. For instance, the extracted sample information may be used to turn the laser beam on and off while scanning the sample. In this case, the extracted sample information may be considered as a virtual binary mask transmitting and blocking the light beam during its scan movement corresponding to ON and OFF states of the light beam, respectively. As another example for modulating the light beam, in order to implement a virtual grey-scaled mask, the intensity of the light beam may be varied continuously or in a plurality of steps rather than to simply turn on and off the light beam.

Usage of a virtual mask being represented by the extracted sample information for controlling light application in a subsequent manipulation of the sample allows for a large variety of experiments. Further, it may also be considered to generate the sample information for modulating the light beam prior to the actual experiment, i.e. off-line, for instance by creating binary images. These images may be used to spatially control the light beam, enabling the application of arbitrary light patterns on the sample.

The modulated light beam used in the method according to an embodiment of the present invention may be any type of beam, in particular a laser beam. However, the modulated light beam is not a light beam causing stimulated emission depletion.

Preferably, the extracted sample information comprises a modulation map determining a relationship between at least one parameter of the light beam to be modulated and positions within the sample to be scanned with the modulated light beam. Such a modulation map, which corresponds to the afore-mentioned virtual mask, may be considered as a function between a position vector within the sample and a data vector describing data specifying the modulation of the light beam.

The modulation map may correspond to at least a part of the first image, said part being preferably more than 50%, more preferably more than 80%, and most preferably more than 95% of the first image. The larger the map, the more accurately the light beam can be controlled. On the other hand, if the size of the map is reduced, the sample information can be extracted faster.

Preferably, the map comprises an intensity profile of at least a part of the first image, said intensity profile being generated using one or more intensity threshold values. Using such intensity threshold values enables the modulation map to be created very fast.

In a preferred embodiment, said extracted sample information is generated at least partly by applying an image processing algorithm increasing the resolution and/or the contrast of the first image of the sample. A suitable processing algorithm is e.g. a deconvolution algorithm and/or a deblurring algorithm. This embodiment provides for a two-stage process for extracting the sample information which is used to modulate the light beam. Thus, in a first, essentially hardware-based stage, image data is provided in form of the first image which may be a raw image with relatively low resolution. Accordingly, the first image may be taken e.g. by applying a fast, non-scanning process. In a second, essentially software-based stage, the spatial resolution is increased by applying the afore-mentioned image processing algorithm. As a result, a virtual mask corresponding to the extracted sample information can be created with high resolution despite the relatively low quality of the first image.

Another advantage can be seen in generally improving the quality of the virtual mask. Thus, by applying an enhancing image processing algorithm, any interfering artefacts may be avoided from occurring in the first place when the mask is created e.g. by applying a threshold. As a result, it may not be necessary to apply an artefact correcting segmentation algorithm at a later stage.

In a specific embodiment, the extracted sample information corresponds to a black-and-white image. In such a case, the sample information can be generated very fast.

In a further embodiment, the extracted sample information is generated by applying an image segmentation algorithm. For instance, such an image segmentation algorithm may be used to reasonably cluster black and white regions.

Further, the image segmentation algorithm may comprise a machine learning algorithm, preferably a deep learning algorithm.

In a further preferred embodiment, the method comprises the steps of displaying at least a part of the extracted sample information to a user, and modifying the extracted sample information in response to user input before recording the second image. For instance, in case that the virtual mask generated by using a threshold contains undesired selection areas, an erase tool may be used to allow the user to delete these undesired selection areas from the mask.

Preferably, the segmentation algorithm may utilize a neural network, and the user input may be used to train the neural network. In this way, the sample information corresponding to the virtual mask can be generated even more efficiently.

The light beam may be modulated in terms of at least one beam property selected from a group comprising intensity, wavelength, and polarization. In a preferred embodiment, the sample is deliberately bleached by the light beam. However, any other type of sample manipulation may be considered for implementing an embodiment of the present invention, as well as any type of imaging.

The method may be used for fluorescence recovery after photo bleaching (FRAP) or fluorescence loss in photo bleaching (FLIP) experiments. In FLIP and FRAP experiments as well as in any other experiment e.g. based on photo conversion or photo activation using laser light, the method of an embodiment of the present invention may be used to derive ROIs from complex sample structures as nuclei, endoplasmatic reticulum etc.

The first image and/or the second image of the sample may be recorded using a scan microscope and/or a widefield microscope and/or a light sheet microscope. In particular, the first and second images may be recorded by using different microscopy methods. For instance, the first image may be generated by using a widefield method, whereas the second image may be generated by using a confocal scan method.

Preferably, the sample is scanned with the light beam by means of a scanner configured to variably deflect the light beam. Such a scanner may be formed by one or more galvanometer mirrors or by a digital micromirror device (DMD).

According to another aspect, a microscope for imaging a sample is provided, comprising a first imaging device configured to record a first image of the sample, the first image being represented by image data; an analyzer configured to extract sample information from the first image by analyzing the image data; a light source configured to emit a light beam; a scanner configured to scan at least a part of the sample with said light beam; a modulator configured to modulate the light beam scanning the sample based on the extracted sample information; and a second imaging device configured to record a scan image of the sample during and/or after scanning the sample with the modulated light beam.

The afore-mentioned first and second imaging devices may apply the same or different imaging methods. For example, the first imaging device may be implemented as a widefield microscope, whereas the second imaging device may be implemented by a confocal scan microscope. Further, the first and second imaging device may also be formed by a single device commonly used to record the first and second images.

According to another aspect, a computer program with a program code for performing the afore-mentioned method is provided.

FIG. 1 is a schematic diagram showing a microscope 100 according to an embodiment, the microscope 100 being configured to image a sample 102.

The microscope 100 comprises a first imaging device 104 which is configured to record a first image I1 which is represented by image data ID1. The microscope 100 may comprise a processor 106 including an analyzer 108. The analyzer 108 serves to analyze the image data ID1 in order to extract sample information SI from the first image I1.

The microscope 100 shown in FIG. 1 may further comprise an illumination unit 110 including a light source 112, a scanner 114, and a modulator 116. The light source 112 is preferably formed by a laser device emitting a light beam LB toward the scanner 114. The scanner 114 is e.g. formed by one or more galvanometer mirrors or a digital micromirror device and configured to variably deflect the light beam LB so that the light beam LB performs a scanning movement on the sample 102. The modulator 116 serves to modulate the light beam LB based on the sample information SI provided by the analyzer 108. Preferably, the modulator 116 is configured to modulate the intensity of the light beam LB depending on the sample information SI. Additionally or alternatively, the light beam 112 may also be modulated in terms of its wavelength and/or polarization.

It is to be noted that the configuration being comprised of the light source 112, the scanner 114, and the modulator 116 as shown in FIG. 1 is purely schematic. In particular, the afore-mentioned configuration is not restricted to the specific order in which the afore-mentioned components 112, 114, 116 are arranged in series, as schematically depicted in FIG. 1. Thus, the modulator 116 may also be integrated with the light source 112 in order to perform the desired modulation of the light beam LB in accordance with the sample information SI generated by the analyzer 108. In any case, the light source 112, the scanner 114 and the modulator 116 interact with each other such that the light beam LB emitted from the illumination unit 110 scans the sample 102 while being modulated in accordance with the sample information provided by the analyzer 108. In this way, at least one beam property, e.g. intensity, wavelength, and/or polarization of the light beam LB varies in a controlled manner as the light beam moves across the sample 102. In other words, modulating the light beam LB results in a spatial control of the light output towards the sample 102.

The microscope 100 may further comprise a second imaging device 111. The second imaging device 111 serves to record a second image I2 of the sample 102 wherein recording is performed during and/or after scanning the sample 102 with the modulated light beam LB. In case that recording of the second image I2 is performed after scanning, the modulated light beam LB may be used to manipulate the sample 102 in preparation for a subsequent image acquisition. For instance, the light beam LB may be used to deliberately bleach the sample 102 in a FRAP or FLIP process. On the other hand, when recording is performed during scanning, the modulated light beam may be used to induce fluorescence within the sample to be detected by the second imaging device 111 during image acquisition.

The analyzer 108 may be configured to extract the sample information SI in form of a modulation map determining a relationship between at least one parameter of the light beam LB to be modulated and positions within the sample 102 to be scanned with the modulated light beam LB. For instance, in order to generate the afore-mentioned map, the analyzer 108 may use one or more intensity threshold values to generate an intensity profile of the first image I1 or a part thereof. Further, the analyzer 108 may apply an image processing algorithm, e.g. a deconvolution algorithm and/or a deblurring algorithm to the image data ID1 such that the resolution and/or the contrast of the first image I1 increases. In other words, whereas the first image I1 may be generated with relatively low resolution or contrast, the sample information SI can be generated with relatively high resolution or contrast. The modulation map may be considered as a virtual mask corresponding e.g. to a black-and-white image or a grey-scale image.

According to the embodiment shown in FIG. 1, the microscope 100 may further comprise a display device 118 which is used to display at least a part of the extracted sample information SI to a user. By operating an input device 120, the user may provide a user input UI in order to modify the sample information SI according to his or her preferences. For example, the input device 120 may be used as an erase tool allowing the user to delete undesired selection areas from the virtual mask corresponding to the sample information SI. In this case, the input device 120 outputs a modified sample information MSI to the analyzer 108 which subsequently uses the modified sample information MSF for modulating the light beam LB (as indicated by a dotted arrow in FIG. 1).

FIGS. 2a to 2d illustrate an example work flow of a fictional FRAP experiment generally performed for determining the kinetics of diffusion through tissue or cells.

Figure 2A:
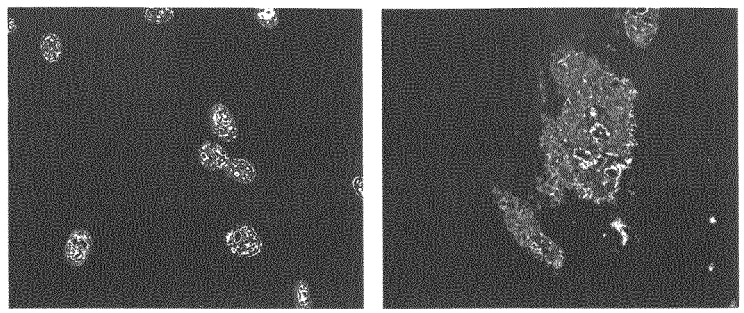
FIGS. 2a to 2d show a work flow of a FRAP experiment as an example for applying the method.

In a first step illustrated in FIG. 2a, an image of a protein of interest is acquired (left). Further, an image of a reference dye is acquired (right).

Figure 2B:
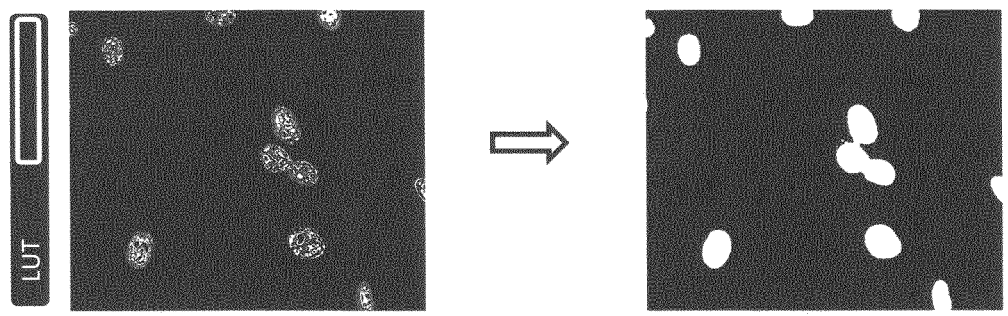

In a second step illustrated in FIG. 2b, a threshold is applied to generate a virtual binary mask based on the image of the reference dye. In the illustrated example, the mask shows white areas at the positions of cell nuclei.

Figure 2C:
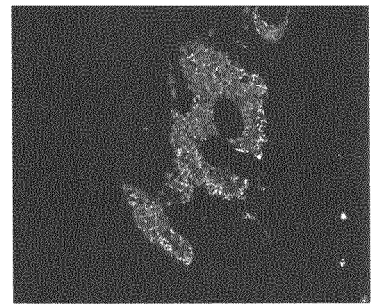

In a third step illustrated in FIG. 2c, the laser power is modulated such that only the fluorescent protein in the nucleus is bleached.

Figure 2D:
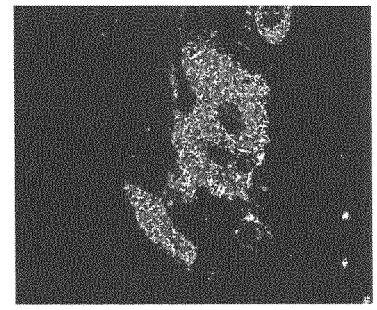

In a fourth step illustrated in FIG. 2d, a subsequent time-lapse recording is performed so that the diffusion of the fluorescently tagged protein into the bleached nucleus area can be monitored.

As can be understood from the above description, the imaging method according to an embodiment of the present invention takes much less time compared to manual ROI drawing. Especially in vivo samples tend to change shape rapidly thereby limiting the available time for ROI generation. Due to the automatic ROI generation as described herein, a plurality of ROIs exhibiting complex structures can be generated simultaneously. In contrast, drawing those structures manually usually results in less complex and less detailed structures to be imaged.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 sample
104 first imaging device
106 processor
108 analyzer
110 illumination unit
111 second imaging device
112 light source
114 scanner
116 modulator
118 display
120 input device
I1 first image
I2 second image
ID1 image data
SI sample information
MSI modified sample information
LB light beam
UI user input

The invention claimed is:

1. A method for imaging a sample using a microscope, the method comprising:
   recording a first image of the sample, the first image being represented by image data;
   extracting sample information from the first image by analyzing the image data using an analyzer;
   scanning at least a part of the sample with a light beam while modulating the light beam based on the extracted sample information; and
   recording a second image of the sample during and/or after scanning the sample with the modulated light beam,
   wherein the first image and/or the second image of the sample is recorded using a scan microscope, a wide-field microscope and/or a light-sheet microscope.

2. The method according to claim 1, wherein the extracted sample information comprises a modulation map determining a relationship between at least one parameter of the light beam to be modulated and positions within the sample to be scanned with the modulated light beam.

3. The method according to claim 2, wherein the modulation map corresponds to at least a part of the first image.

4. The method according to claim 3, wherein the part of the first image is more than 50% of the first image.

5. The method according to claim 2, wherein the modulation map comprises an intensity profile of at least a part of the first image, the intensity profile being generated using one or more intensity threshold values.

6. The method according to claim 1, wherein the extracted sample information is generated at least partly by applying an image processing algorithm increasing resolution and/or contrast of the first image of the sample.

7. The method according to claim 6, wherein the image processing algorithm is a deconvolution algorithm and/or a deblurring algorithm.

8. The method according to claim 1, wherein the extracted sample information corresponds to a black-and-white image.

9. The method according to claim 1, wherein the extracted sample information is generated by applying an image segmentation algorithm.

10. The method according to claim 9, wherein the image segmentation algorithm comprises a machine learning algorithm.

11. The method according to claim 10, wherein the machine learning algorithm is a deep learning algorithm.

12. The method according to claim 10, wherein the segmentation algorithm utilizes a neural network, and wherein user input is used to train the neural network.

13. The method according to claim 1, further comprising displaying at least a part of the extracted sample information to a user, and modifying the extracted sample information in response to a user input before recording the second image.

14. The method according to claim 1, wherein the light beam is modulated in terms of at least one beam property selected from a group comprising intensity, wavelength, and polarization.

15. The method according to claim 1, wherein the sample is deliberately bleached by the light beam.

16. The method according to claim 15, wherein the method is used for fluorescence recovery after photobleaching or fluorescence loss in photobleaching.

17. The method according to claim 1, wherein the sample is scanned with the light beam by a scanner that variably deflects the light beam.

18. A microscope for imaging a sample, the microscope comprising:
    a first imaging device configured to record a first image of the sample, the first image being represented by image data;
    an analyzer configured to extract sample information from the first image by analyzing the image data;
    a light source configured to emit a light beam;
    a scanner configured to scan at least a part of the sample with the light beam;
    a modulator configured to modulate the light beam scanning the sample based on the extracted sample information; and
    a second imaging device configured to record a second image of the sample during and/or after scanning the sample with the modulated light beam,
    wherein the first image and/or the second image of the sample is recorded using a scan microscope, a widefield microscope and/or a light-sheet microscope.

19. A tangible, non-transitory computer-readable medium having instructions, which, when executed on one or more hardware processors, alone or in combination, provide for execution of the method according to claim 1.

20. A method for imaging a sample using a microscope, the method comprising:
    recording a first image of the sample, the first image being represented by image data; extracting sample information from the first image by analyzing the image data using an analyzer;
    scanning at least a part of the sample with a light beam while modulating the light beam based on the extracted sample information; and
    recording a second image of the sample during and/or after scanning the sample with the modulated light beam,
    wherein the extracted sample information corresponds to a black-and-white image or is generated by applying an image segmentation algorithm.

21. A microscope for imaging a sample, the microscope comprising:
    a first imaging device configured to record a first image of the sample, the first image being represented by image data;
    an analyzer configured to extract sample information from the first image by analyzing the image data;
    a light source configured to emit a light beam;
    a scanner configured to scan at least a part of the sample with the light beam;
    a modulator configured to modulate the light beam scanning the sample based on the extracted sample information; and
    a second imaging device configured to record a second image of the sample during and/or after scanning the sample with the modulated light beam,
    wherein the extracted sample information corresponds to a black-and-white image or is generated by applying an image segmentation algorithm.

22. A method for imaging a sample using a microscope, the method comprising:
    recording a first image of the sample, the first image being represented by image data; extracting sample information from the first image by analyzing the image data using an analyzer;
    scanning at least a part of the sample with a light beam while modulating the light beam based on the extracted sample information; and
    recording a second image of the sample during and/or after scanning the sample with the modulated light beam,
    wherein the sample is deliberately bleached by the light beam.

23. A microscope for imaging a sample, the microscope comprising:
    a first imaging device configured to record a first image of the sample, the first image being represented by image data;
    an analyzer configured to extract sample information from the first image by analyzing the image data;
    a light source configured to emit a light beam;
    a scanner configured to scan at least a part of the sample with the light beam;
    a modulator configured to modulate the light beam scanning the sample based on the extracted sample information; and
    a second imaging device configured to record a second image of the sample during and/or after scanning the sample with the modulated light beam,
    wherein the sample is deliberately bleached by the light beam.

* * * * *